April 7, 1936.  H. B. NEWHALL  2,036,352

FASTENER SUPPLYING APPARATUS

Filed Sept. 19, 1934  2 Sheets-Sheet 1

INVENTOR
Herbert B. Newhall
By his Attorney
Harlow M. Davis

April 7, 1936.  H. B. NEWHALL  2,036,352
FASTENER SUPPLYING APPARATUS
Filed Sept. 19, 1934  2 Sheets-Sheet 2
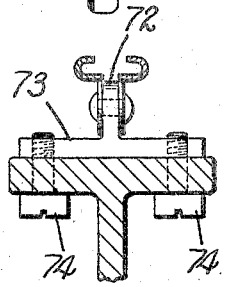
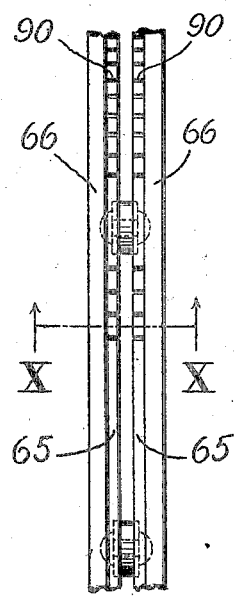
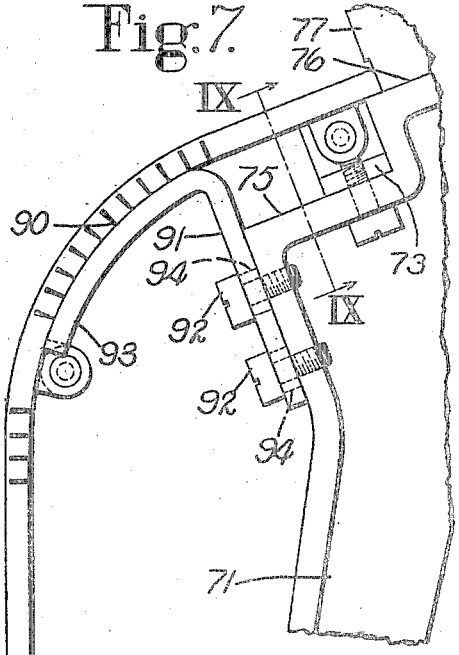

Patented Apr. 7, 1936

2,036,352

UNITED STATES PATENT OFFICE 2,036,352

FASTENER SUPPLYING APPARATUS

Herbert B. Newhall, Saugus, Mass., assignor to United Shoe Machinery Corporation, Paterson, N. J., a corporation of New Jersey Application September 19, 1934, Serial No. 744,693

18 Claims. (Cl. 218—15.1)

This invention relates to fastener-supplying apparatus and is herein illustrated as embodied in raceway constructions designed to supply eyelets in eyelet-inserting machines. However, the invention is not limited to eyelet-raceways since the novel features herein set forth are adapted to be embodied also in raceways for other articles of certain shapes, such as rivets.

The making of raceways as heretofore constructed, particularly those having bends, twists, or both, requires much time and special work. It has heretofore been customary in this art to make each raceway of at least three principal parts, viz., a bed-plate and two parallel fastener-retaining strips spaced from the bed-plate and from each other to form a T-slot or passageway in which the fasteners may travel. Each of these parts must be shaped individually, and if such a raceway is to have a bend or a twist or both compounded much skill and painstaking work are required to coordinate their irregularities of shape in preparing these parts for assembling. Once the parts of such a raceway have been connected in assembled relation, the raceway becomes rigid and no adjustment of one end relatively to the other is possible.

In view of these conditions, an object of the present invention is to provide raceways of improved construction that may be readily made without requiring highly specialized workmanship and that may be bent and twisted after they are made, if need be, without encountering any such problems as those referred to above.

To this end, and in accordance with a feature of the invention, each of the two illustrated raceways is made of flexible sheet-metal of clencher cross-section having confronting portions spaced apart, and longitudinally extending U-shaped folds connecting them, each of the folds and one of the confronting portions connected thereby being intersected by transverse kerfs arranged to increase the flexibility of the raceway without wholly interrupting its continuity. Two examples embodying the above-defined features are illustrated, in each of which the raceway comprises a bed and two cooperative fastener-retaining flanges. In one of these examples the raceway is made of a single strip of sheet-metal having two longitudinally extending U-shaped folds by which its longitudinal margins are arranged to provide both fastener-retaining flanges in confronting relation to the median band which constitutes the bed. In the other example the raceway is made of two strips, each of U-shaped section, one flange of each strip being arranged to provide a section of the bed and the other flange of each strip constituting a fastener-retaining flange, the essential difference between the two modifications being that the bed of the latter modification is divided lengthwise to provide for utilizing U-shaped strips of standard section to produce raceways of various widths according to the fittings employed to connect them in assembled relation.

The invention also provides an improved combination comprising a raceway-supporting member, a flexible raceway the receiving end of which is affixed to the supporting member, and adjustable means by which the delivery end of the raceway is rigidly secured to the supporting member with provision for adjusting it lengthwise and widthwise, to the end that it may be readily located to register with a fastener-inserting tool in a machine for inserting fasteners. Other features of the invention are hereinafter described and claimed.

Referring to the drawings,

Fig. 7 is a front elevation of an assemblage forming a detachable fastener-supplying unit and comprising a rigid raceway-supporting member and a flexible raceway in which the invention is embodied in two complemental strips of U-shaped section;

Fig. 8 is a face view of a portion of a raceway of the type shown in Fig. 7;

Fig. 9 is a sectional view of the structure intersected by line IX—IX of Fig. 7;

Fig. 10 is a cross-section through the raceway at an intermediate point, see line X—X of Fig. 8;

Fig. 11 is an end elevation of the delivery end of the raceway and the parts connected thereto;

Fig. 12 is a perspective view of a portion of one of the complemental strips used in making a two-piece raceway;

Fig. 13 is an elevation of an attaching member designed to be used at the receiving end of a relatively narrow raceway instead of the attaching member shown in Fig. 9; and Fig. 14 is an elevation of an attaching member designed to be used at the delivery end of a relatively narrow raceway instead of that shown in Fig. 11.

Since the present invention is concerned chiefly with improvements in fastener-supplying apparatus, a very brief description of the illustrated fastener-inserting machine will suffice, although a more extensive description of a machine of the same general type may be found in a copending application, Serial No. 669,178, filed May 3, 1933, in the name of J. A. Johnson.

Figure 1:
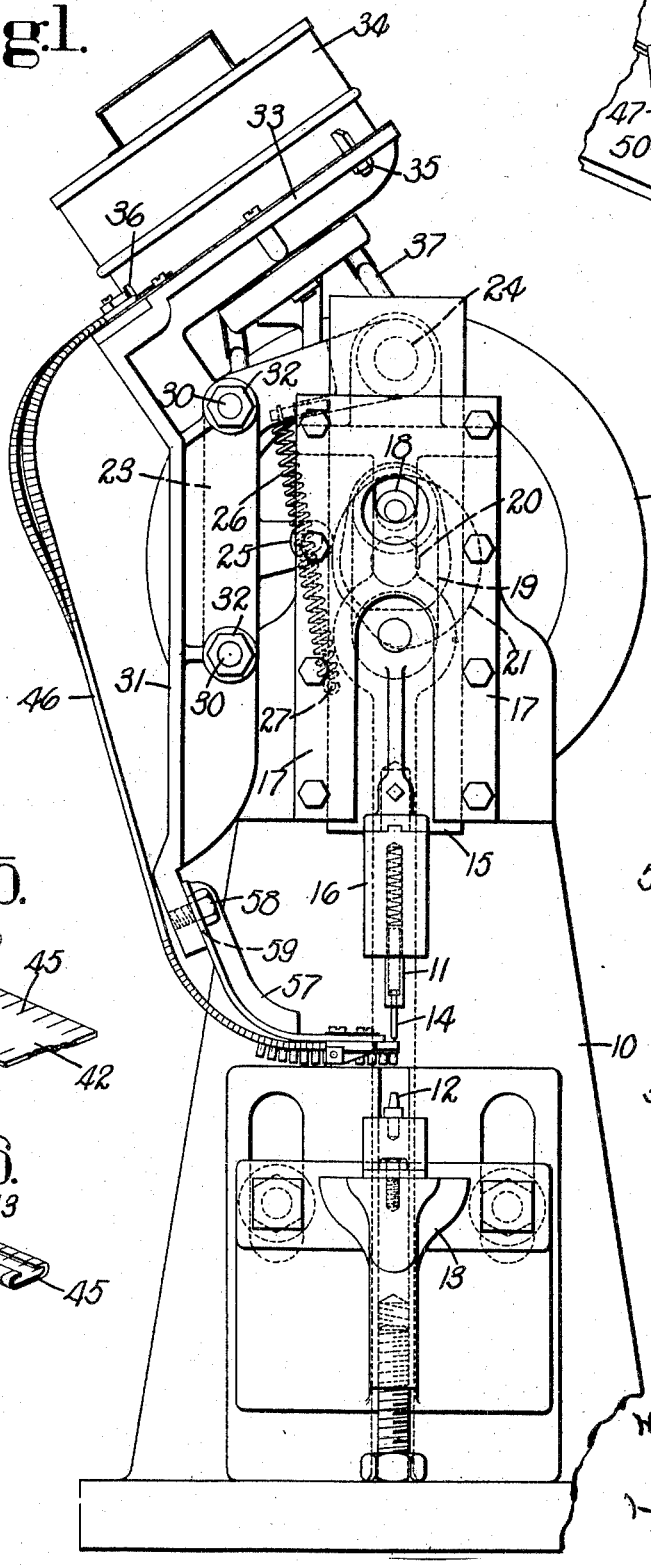
Fig. 1 is a front elevation of a fastener-inserting machine provided with fastener-supplying means embodying one embodiment of the present invention.

Referring to Fig. 1, the frame of a fastener-inserting machine is indicated at 10. A vertically movable fastener-inserting tool is indicated at 11, and a stationary tool for clenching the fasteners is indicated at 12. The tool 12 is affixed to a horn 13 which, in turn, is affixed to the frame 10. The tool 11, which is of a well-known type commonly used for inserting eyelets, is provided with a central spring-pressed spindle 14 and is carried toward and from the tool 12 by a slide 15 to which it is connected by a block 16. The slide 15 is arranged in vertical guides 17 in the frame 10 and is reciprocated by a wrist-pin 18 to which it is connected by a link 19. The wrist-pin 18 is carried by a rotary shaft 20 which also carries a raceway-operating cam 21 and is driven by any suitable means which may comprise a continuously driven pulley 22 loosely mounted on the shaft 20, and a clutch of any preferred type for establishing driving connection between the pulley and the shaft.

The illustrated machine is also provided with an arm 23 for operating a raceway. This arm is mounted on a fulcrum-pin or rod 24 and is provided with a cam-roll 25 arranged to run on the cam 21. The roll 25 is maintained against the cam by a tension spring 26, the upper end of which is connected to the arm 23 and the lower end of which is attached to a stationary anchoring pin 27. The arm 23 is provided with two parallel studs 30, 30 to provide a mounting for a detachable fastener-supplying unit.

The assemblage shown in Fig. 1 includes a rigid raceway-carrier 31 which may be secured on the studs 30 by nuts 32. The upper part of the carrier 31 is formed to provide a flat inclined platform 33 on which a cylindrical fastener-supplying hopper 34 is seated and secured thereto by any suitable devices such as lugs and nuts, one of which is indicated at 35. The lower portion of the cylindrical wall of the hopper 34 is provided with an outlet-port 36 of a size and shape to emit eyelets but only those that stand with their flanges on the platform 33 and their barrels projecting upwardly therefrom. The eyelets thus emitted gravitate through a flexible raceway, the delivery end of which is arranged to present them one at a time to the spindle 14 of the inserting tool 11. Any suitable means, such as a rotary brush (not shown), may be arranged in the hopper 34 to promote the emission of eyelets through the port 36, and such a brush may be driven by a belt 37 in well-known manner.

Figure 5:
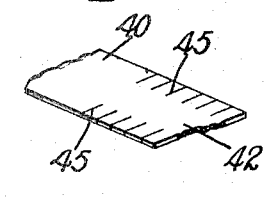
Fig. 5 is a perspective view of a portion of a strip of sheet-metal adapted to be converted into a one-piece raceway by folding its longitudinal margins toward each other.
Figure 6:
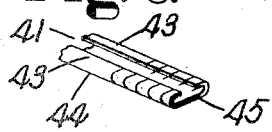
Fig. 6 represents a fragment of a one-piece raceway made from a strip of the type shown in Fig. 5.

A one-piece raceway embodying the construction illustrated in Figs. 1 to 6, inclusive, is made of a strip 40 of moderately ductile sheet-metal such as soft steel, which is initially flat as represented in Fig. 5 but which is formed to a substantially C-shaped cross-section, as shown in Fig. 6, hereinafter for convenience spoken of as a "clencher" cross-section, by folding its longitudinal margins toward each other and leaving a slot 41 between the inner edges of the inturned margins. The median longitudinal band 42 of this strip constitutes the bed of the raceway, and the inturned margins 43 constitute the fastener-retaining flanges which lie in confronting relation to the bed and are connected therewith by the longitudinally extending folds 44 of U-shaped cross-section.

To increase the flexibility of such a raceway at points where a bend of short radius or a twist may be desired, transverse kerfs are cut so that they will intersect not only the U-shaped folds 44 but will also intersect either the bed or the fastener-retaining flanges. In the embodiment now under consideration these kerfs, indicated at 45, are cut in the unformed strip 40 (Fig. 5) and extend toward each other from the longitudinal edges of the strip to the lines of junction at which the U-shaped folds 44 adjoin the bed of the raceway, that is, the median band 42 of the strip, but they do not extend across the bed. The inner end of one of these kerfs is indicated at 45 at the right of Fig. 6. Thus, the bed-band of the raceway is left intact to preserve the continuity of the raceway, although the retaining flanges 43 and the connecting folds 44 are kerfed. Consequently, a raceway thus provided with a group or series of closely related kerfs may be readily bent and twisted without appreciably increasing or decreasing the space between the bed and the fastener-retaining flanges. The flexibility afforded by the kerfs may be much or little according to the number and the spaced relation of the kerfs.

In an organization of the type illustrated in Fig. 1, it is desirable to provide for two bends of the raceway near its ends and to leave the intermediate portion 46 straight and comparatively stiff or rigid. This intermediate portion may be offset a considerable distance from the raceway-supporting member 31. Consequently, as shown in Fig. 1, the kerfs are localized in groups in the portions to be bent but no kerfs are cut in the intermediate straight portion 46. Moreover, in those portions where the kerfs are localized those at one side of the raceway are arranged out of line with those at the opposite side. This non-alinement or staggered relation of the kerfs spreads or distributes the flexure of the non-kerfed bed 42 and avoids too much weakening of the raceway in any one line.

Figure 2:
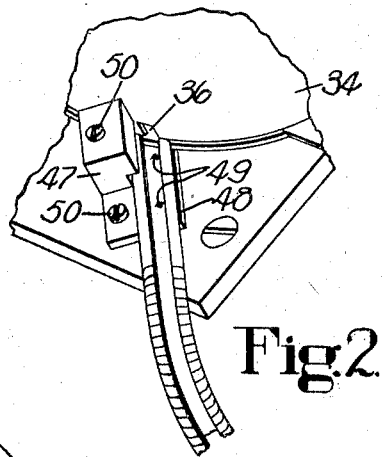
Fig. 2 is a perspective view including a portion of the hopper and the receiving end of a flexible raceway secured in cooperative relation thereto.

As shown in Figs. 1 and 2, the receiving end of the raceway is provided with a reinforcing block 47 by which it may be affixed to the raceway-carrier 31 in cooperative relation to the emission port 36 in the hopper 34. The block 47 is provided with a flat ear 48 on which the bed of the raceway is seated, and a permanent connection may be provided by spot-welding these two portions, as indicated by the shaded areas 49. The block may be affixed to the raceway-supporting member 31 by screws 50.

Figure 3:
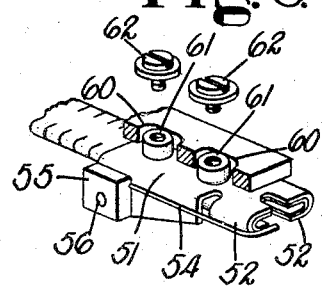
Fig. 3 is a perspective view of the delivery end of a raceway of the type included in Figs. 1 and 2. This figure also includes attaching parts by which the delivery end may be affixed to a rigid supporting member with provision for adjustments.
Figure 4:
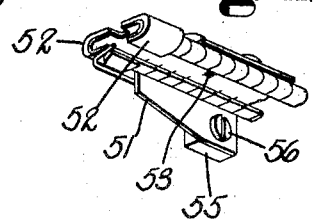
Fig. 4 is another view of the delivery end of the raceway represented in Fig. 3.

The details of construction of the delivery end of the raceway are shown in Figs. 3 and 4. This portion of the raceway is reinforced by a sheet-metal member 51 suitably cut to provide ears or tabs 52 which are bent to form a clencher cross-section and to embrace the delivery end of the raceway which may be inserted endwise into the socket thus formed. The body portion of the member 51 is flat and lies in contact with the bed or median band of the raceway and may be spot-welded thereto as indicated by a shaded area 53 in Fig. 4. A resilient detent is arranged to arrest the eyelets at the delivery end of the raceway. For this purpose a short piece of spring-wire 54 bent to L-shape is clamped against a portion of the reinforcing member 51 by a nut 55 with which a screw 56 cooperates.

To provide for supporting the delivery end of the raceway and at the same time to provide for accuracy in registering it with the inserting tool 11, relatively adjustable parts are provided to connect the reinforcing member 51 with the lower portion of the member 31. For this purpose a bracket 57 is secured to the member 31 by a clamping bolt 58, an elongated hole 59 being formed in the bracket to receive the bolt. The bracket 57 may be adjusted up and down within the range of the hole 59 to support the delivery end of the raceway at various levels, and it may also be adjusted angularly about the axis of the clamping bolt to provide sidewise adjustment of the raceway. The connection between the bracket 57 and the reinforcing member 51 provides for adjusting the delivery end of the raceway lengthwise. For this purpose the lower end of the bracket 57, which is flat and approximately horizontal, is provided with two elongated holes 60 each adapted to receive one of two bosses 61 welded or otherwise affixed to the reinforcing member 51. These bosses are bored and tapped to provide screw-threaded sockets for the reception of clamping screws 62 by which the reinforcing member 51 may be clamped in various positions of adjustment within the range of the holes 60. Thus, while the receiving end of the raceway may be fixed relatively to the supporting member 31 it may also be adjusted in every direction necessary to obtain the most desirable relation between it and the fastener-inserting tool 11.

Although some of the details of construction in the raceway illustrated in Figs. 7 to 12, inclusive, differ from those embodied in the raceway described above, the principles of flexibility and organization are similar. In the construction now about to be described, the raceway is made of two strips of moderately ductile sheet-metal instead of one, this feature of construction having the advantage that it provides for making raceways of various widths from duplicate formed strips of one standard size and form. As shown in Figs. 10 and 12, a raceway embodying this construction comprises two strips of U-shaped section arranged in opposed relation. The flanges 65 of these strips constitute the bed of the raceway. The fastener-retaining flanges 66 confront the bed-flanges 65 and are connected therewith by longitudinally extending folds 67. In a raceway of this construction, the bed flanges 65 are preferably wider than the fastener-retaining flanges 66, since a considerable space must be left between the edges of the latter to provide a slot through which the barrel portions of eyelets or the shank portions of rivets may project. Each of the wider flanges 65 is provided with a series of perforated ears 68 projecting at right-angles thereto from its inner edge, whereby two complemental strips may be rigidly connected by suitable fasteners, such as rivets 69.

In assembling two complemental strips to form a raceway of minimum width, the ears 68 of one strip will be placed in contact with those of the other strip (Figs. 13 and 14) when the fasteners 69 are applied, but wider raceways may be produced by interposing spacers between the ears as illustrated in Figs. 9, 10 and 11, the thickness of such spaces being determined according to the desired width of the raceway. Thus, to space the ears other than those at the ends of the raceway washers 70 (Fig. 10) may be interposed, leaving the ears at the ends of the raceways temporarily without any interposed spacing elements until the raceway is otherwise assembled and ready to be attached to a carrier such as that indicated at 71 in Fig. 7. At this stage spacing members designed to do double duty may be interposed and fastened between the ears at the ends of the raceway. For example, as shown in Figs. 7 and 9, the ears at the receiving end of the raceway are spaced by and secured to an ear 72 projecting from a foot-piece 73 by which the receiving end may be affixed to the carrier 71. This foot-piece is bored and tapped to provide internal screw-threads for cooperating with attaching screws 74 whereby the foot-piece is anchored to a platform 75 formed on the carrier 71 at a suitable distance below the plane of the platform 76 on which the fastener-supplying hopper 77 is secured.

In like manner the ears nearest the delivery end of the raceway may be spaced apart by and secured to an ear 78 projecting from a split socket member 79 provided with a cylindrical socket to receive and clamp a cylindrical stem portion 80 of a member for connecting the delivery end with the lower portion of the carrier 71. A clamping screw 81 threaded in the socket member 79 provides for contacting the latter to clamp the stem portion 80. The connecting member may be made of a short length of cylindrical rod having a bend 82 between its ends and thus providing another stem portion 83 angularly related to the stem portion 80. The carrier 71 is provided with a cylindrical socket to receive the stem portion 83 and is split to provide for clamping this stem portion when contracted by a clamping screw 84. These connections provide for adjusting the delivery and of the roceway in every direction. For example, depthwise adjustments and widthwise adjustments are possible when the clamping screw 84 is relaxed, and lengthwise as well as widthwise adjustments are possible when the clamping screw 81 is relaxed.

The collar 79 is also provided with a split clamping boss 85 in which a clamping screw 86 is arranged to contact the sections thereof against a resilient detent 87, a portion of which may be interposed between the sections. This detent may be made of a short piece of spring-wire and its free end arranged as shown in Fig. 11 to stand in the path of the barrel of an eyelet or the shank of a rivet at the delivery end of the raceway to prevent accidental discharge from the raceway but at the same time to permit removal of the fasteners from the raceway by the means provided for that purpose.

Flexibility of the raceway shown in Figs. 7 to 14 inclusive is obtained by cutting transverse kerfs 90 through the U-shaped fold and the bed-flange 65 of each strip but leaving the fastener-retaining flange 66 uncut to preserve the continuity not only of its fastener-guiding edge but also of its fastener-supporting surface at those portions of the raceway where the flanges 66 underlie the bed 65. Moreover, when a raceway is bent or curved as shown in Fig. 7 the kerfs 90 close in consequence of such bending, and if the kerfs are not too wide their opposite edges, where they intersect the bed, will abut one another and thus limit the sharpness of bending. These effects require that the kerfs be located at the inner side of the curve, as shown.

To reinforce or brace the bend near the receiving end of the raceway and to limit the sharpness of its curvature, the carrier 71 is provided with an adjustable bracket 91 affixed thereto by clamping screws 92. The bracket is preferably made of ductile steel and its arm 93 is outcurved and arranged to engage the incurved surface of the bend of the raceway. In effect, this bracket constitutes a matrix for establishing the curvature of this bend of the raceway. Slots 94 formed in the anchoring arm of the bracket for the reception of the clamping screws 92 provide for adjusting the bracket up and down so that the curved arm 93 may be located at the most desirable height.

If desired the ends of the raceway may be provided with attaching members of the form shown in Figs. 13 and 14 instead of those shown in Figs. 7, 9 and 11. The attaching member shown in Fig. 13 differs from that shown in Fig. 9 in that it is provided with two spaced fastener-receiving ears 95 between which a pair of ears 68 formed on the raceway are arranged and through which a connecting fastener such as a rivet 96 extends. An attaching member of this type provides for a raceway of minimum width in which the two ears 68 lie in contact with each other, and may also be used with a raceway having spacers between the ears 68, provided the space between the ears 95 is commensurate with the aggregate thickness of the two ears 68 and the interposed spacer.

In like manner the member shown in Fig. 14 for attaching the raceway to the supporting stem 80 may be provided with two spaced ears 97 to receive a fastener 98, the space between the ears 97 being of a width to accommodate a pair of ears 68 with or without an interposed spacer, as the case may be.

Having described my invention, what I claim as new and desire to secure by Letters Patent of the United States is:

1. A sheet-metal raceway of clencher cross-section having confronting portions spaced apart and longitudinally extending U-shaped folds connecting them, two of said portions having article-guiding edges forming a slot, and each of said folds and one of the two confronting portions connected thereby being intersected by transverse kerfs arranged to increase the flexibility of the raceway without wholly interrupting its continuity.

2. A sheet-metal raceway of clencher cross-section having a bed, article-retaining flanges having mated article-guiding edges forming a slot, said flanges being spaced from and confronting said bed, and longitudinally extending folds connecting said flanges with said bed, said flanges and said folds being intersected by closely related transverse kerfs arranged to increase the flexibility of the raceway without interrupting the continuity of said bed.

3. A sheet-metal raceway having a bed, fastener-retaining flanges having mated fastener-guiding edges forming a slot, said flanges being spaced from and confronting said bed, and longitudinally extending folds connecting said flanges with said bed, said bed and said folds being intersected by closely related transverse kerfs arranged to increase the flexibility of the raceway without interrupting the continuity of said edges.

4. In combination, a raceway-supporting member, a flexible raceway the receiving end of which is affixed to said member, and means by which the delivery end of said raceway is rigidly secured to said supporting member with provision for adjusting it lengthwise and widthwise.

5. In combination, a raceway-supporting member, a raceway the receiving end of which is affixed to said member, the raceway having one or more flexible bends between its ends, and means by which the delivery end of the raceway is affixed to said member with provision for adjusting it widthwise and depthwise.

6. In combination, a raceway carrier and a flexible curved raceway having longitudinally extending article-retaining flanges defining a slot through which the articles may project, both ends of the raceway being rigidly secured to said carrier, the means for securing the delivery end having provisions for adjusting that end lengthwise and widthwise relatively to the receiving end.

7. In combination, a raceway-carrier, a hopper carried thereby, a flexible curved raceway the receiving end of which is rigidly secured in cooperative relation to said hopper, and means by which the delivery end of the raceway is rigidly secured to said carrier with provisions for adjusting it lengthwise and widthwise relatively to the receiving end thereof.

8. In combination, a raceway-supporting member, a raceway the delivery end of which is provided with a rigid member, a member connecting the other said members, said raceway-supporting member and said connecting member having one a cylindric socket and the other a cylindric stem arranged therein, and said rigid member and said connecting member being likewise provided one with a cylindric socket and the other with a cylindric stem arranged therein, and means for securing said stems in said sockets respectively with provision for relative turning and relative axial adjustment of the members, the receiving end of the raceway being secured individually to said raceway-supporting member and the raceway having one or more flexible bends between its ends.

9. In combination, a raceway-supporting member having a cylindrical socket, a raceway the delivery end of which is provided with a member having a cylindrical socket, a connecting member having two cylindrical stem portions angularly related to each other and arranged respectively in said sockets, and means for securing said stem portions in said sockets with provisions for axial and angular adjustments, the receiving end of said raceway being secured individually to said raceway-supporting member and the raceway having one or more flexible bends between its ends.

10. A fastener-inserting machine comprising a movable fastener-inserting tool, a hopper for supplying fasteners thereto, a raceway arranged to conduct the fasteners from said hopper to said tool, said raceway having one or more flexible bends, a member by which the delivery end of said raceway is carried to and fro to present the fasteners to said tool, and means by which the delivery end of the raceway is secured to said member with provisions for adjusting it lengthwise and widthwise.

11. A fastener-inserting machine comprising a frame, a movable tool arranged to insert a fastener, a carrier mounted on said frame, a fastener-supplying hopper mounted on said carrier, a raceway having one or more flexible bends, the receiving end of said raceway being affixed to said carrier in cooperative relation to said hopper, and attaching means including relatively adjustable parts by which the delivery end of the raceway is rigidly secured to said carrier with provisions for adjusting it lengthwise and depthwise.

12. A raceway comprising two strips of U-shaped section each having a series of perforated ears projecting from the edge of one of its flanges, the ears of each strip confronting those of the other to form pairs, and fasteners extending through said ears to connect the strips rigidly in cooperative relation.

13. A raceway comprising two strips of U-shaped section each having one flange wider than the other and each having a series of perforated ears projecting from the edge of the wider flange, and fasteners extending through said ears to connect the strips rigidly in cooperative relation.

14. A raceway comprising two strips of U-shaped section each having a series of perforated ears projecting from the edge of one of its flanges, the ears of each strip confronting those of the other to form pairs, fasteners extending through said ears to connect the strips rigidly in cooperative relation, and perforated spacers arranged on said fasteners and interposed between the ears to establish the width of the raceway.

15. A raceway comprising two strips of U-shaped section each having a series of perforated ears projecting from the edge of one of its flanges, the ears of each strip confronting those of the other to form pairs, and fasteners extending through said ears to connect the strips rigidly in cooperative relation, the flanges provided with said ears being intersected by traverse kerfs which also intersect the flange-connecting portions without interrupting the continuity of the other flanges.

16. A raceway comprising two strips of U-shaped section each having a series of perforated ears projecting from the edge of one of its flanges, the ears of each strip confronting those of the other to form pairs, and fasteners extending through said ears to connect the strips rigidly in cooperative relation, one or more of said spacers having a portion outside the boundaries of the raceway for attaching the raceway to a supporting element.

17. A raceway comprising two strips of U-shaped section each having a series of perforated ears projecting from the edge of one of its flanges, the ears of each strip confronting those of the other to form pairs, fasteners extending through said pairs of ears to connect the strips, and one or more raceway-attaching members each secured to a pair of said ears by the fastener extending through that pair.

18. In combination, a raceway-supporting member, a raceway the ends of which are secured thereto, an intermediate portion of the raceway being offset from said member and having a flexible bend, and a matrix-member secured to said supporting member and having an outcurved surface arranged to engage the incurved surface of said bend to brace the latter and limit the sharpness of its curvature.

HERBERT B. NEWHALL.